Nov. 18, 1969  H. V. HANSEN ET AL  3,478,828
MINIMUM TILLAGE HITCH DEVICE
Filed Oct. 28, 1966  2 Sheets-Sheet 1

INVENTORS.
HAROLD V. HANSEN
CHARLES H. YOUNGBERG
PERRY FORD JR.
BY

ATTORNEY

Nov. 18, 1969  H. V. HANSEN ET AL  3,478,828
MINIMUM TILLAGE HITCH DEVICE
Filed Oct. 28, 1966  2 Sheets-Sheet 2

INVENTORS.
HAROLD V. HANSEN
CHARLES H. YOUNGBERG
PERRY FORD JR.
BY
ATTORNEY

United States Patent Office 3,478,828
Patented Nov. 18, 1969

3,478,828
MINIMUM TILLAGE HITCH DEVICE
Harold Valentine Hansen, Cordova, Charles Harold Youngberg, Moline, and Perry Ford, Jr., Rock Island, Ill., assignors to Deere & Company, Moline, Ill., a corporation of Delaware
Filed Oct. 28, 1966, Ser. No. 590,377
Int. Cl. A01b 49/04, 59/043, 63/102
U.S. Cl. 172—669                                    5 Claims

ABSTRACT OF THE DISCLOSURE

In a combination of a tractor and two drawn implements one of which is mounted on the three-point hitch of the tractor so that it will be limited in its lateral movement and the other being connected for free lateral movement on the tractor drawbar, a connection between the two implements so that the latter implement will also be limited in its lateral movement.

---

The present invention relates generally to hitch devices and more particularly to hitch devices used to connect a planter to a tractor when tillage equipment is carried by the tractor.

The modern high horsepower tractors of today have made it possible for farmers to eliminate or combine tillage and planting operations, thus cutting their production costs. Various systems have been adopted depending upon the soil and moisture conditions, tillage practices, and problems of erosion, weeds, water intake or drainage. In one system the field is plowed either in the fall or in the spring and subsequently final seedbed preparation and planting are combined in a single operation. Thus on the following trip through the field a planter is pulled behind a tractor with a harrow being disposed between the planter and the tractor. To perform this combined (or minimum tillage) operation a special form of hitch is required to connect the planter to the tractor while providing sufficient clearance for the harrow.

One form of hitch, shown in U.S. Patent 3,177,828, is designed for use with a harrow that is secured to the drawbar of a tractor, the longitudinally extending hitch being secured to a forward portion of the harrow and the rear end of the hitch being rigidly secured to the frame of the planter. This form of hitch device has a disadvantage in that it is difficult to use when planting contour fields since the planter does not trail closely behind the tilling apparatus.

Another form of minimum tillage hitch is shown in U.S. Patent 3,194,322. In this form of hitch the rear end of the hitch is supported by a castering wheel and the forward end is rigidly secured to the tractor so that the longitudinally extending main frame of the hitch, which passes between the standards of a cultivating device, cannot swing laterally. This form of hitch device has a disadvantage in that special mounting brackets must be provided on the tractor.

It is the principal object of this invention to provide a minimum tillage hitch for securing a planter to a tractor in such a manner that a tillage device may be carried to the rear of the tractor and forwardly of the planter, the hitch not requiring special mounting brackets on the tractor and also causing the planter to trail closely behind the tillage device.

More particularly it is an object of the present invention to provide a hitch device for interconnecting a planter with a tractor having a three-point hitch that carries a ground-working device, the hitch having a rear castering wheel and means to interconnect a portion of the rear end of the hitch device with a portion of the ground-working device carried by the three-point hitch of the tractor to prevent lateral shifting movement of the rear of the hitch device.

These and other objects and advantages of this invention will be apparent to those skilled in the art after a consideration of the following detailed description, taken in conjunction with the accompanying drawings in which the preferred form of this invention is illustrated.

Figure 1:
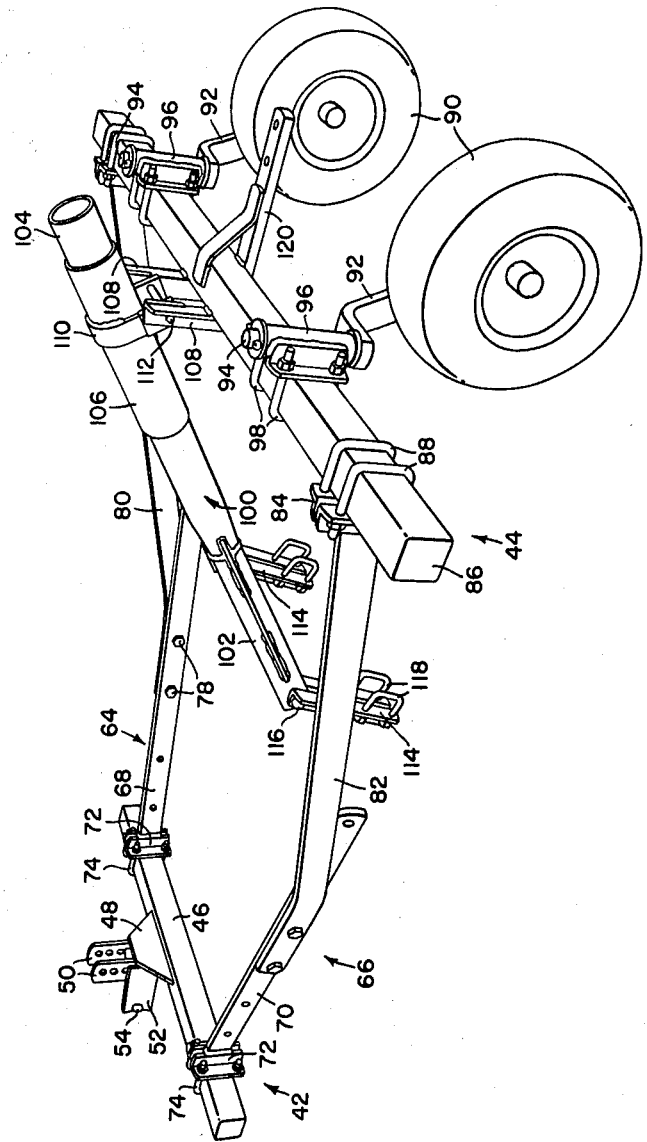
FIG. 1 is a perspective view taken from the rear of the hitch device of this invention.
Figure 2:
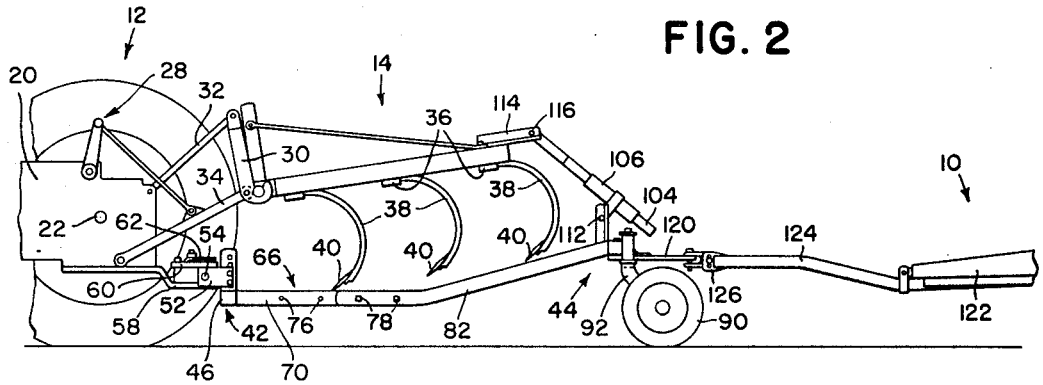
FIG. 2 is a side view of the hitch device as shown in FIG. 1 in which the hitch device is shown secured to the drawbar of a tractor having a three-point hitch to which a tillage implement is secured, the hitch device having secured to its rear end a planter.
Figure 3:
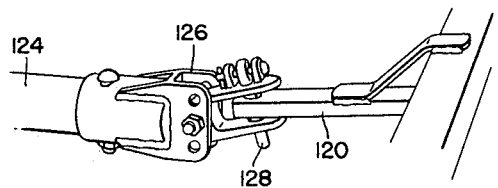
FIG. 3 is a perspective view showing the manner in which the hitch device is secured to the ground-working device carried by the tractor three-point hitch in such a manner to prevent lateral shifting of the rear end of the hitch device.

In the following description right-hand and left-hand reference is determined by standing to the rear of the hitch device and facing the direction of travel.

The hitch device of the present invention is adapted to secure a planter 10 to a tractor 12 having a tillage implement 14 carried by the three-point hitch of the tractor. The tractor, of which only a portion is illustrated, is of conventional construction having a fore-and-aft extending main body 20 which is mounted on a transverse rear axle 22. A three-point hitch, indicated generally at 28, is secured to the main body portion 20 of the tractor, and an implement coupler 30, similar to the type shown in the Hess Patent No. 3,048,228, issued Aug. 7, 1962, is mounted on the upper compression link 32 and lower transversely spaced draft links 34 of the three-point hitch. The draft links are limited or restricted in lateral movement.

The tillage implement 14 is conventional, having a plurality of transversely extending toolbars 36, to which standards 38 are secured, each standard carrying an appropriate ground-working tool 40. It should be noted, however, that this invention is not limited to the particular form of tillage implement shown in the figures and that widely different forms of tillage implements may be employed, such as for example, disk harrows, peg tooth harrows, and other devices capable of preparing a seed bed. It should also be noted that it is not necessary to employ the implement coupler 30, and that, in fact, the tillage implement 14 may be connected directly to the three-point hitch 28 of the tractor in a conventional manner. As is conventional, however, when the implement 14 is supported on the three-point hitch, it is restricted in its lateral movement.

Figure 4:
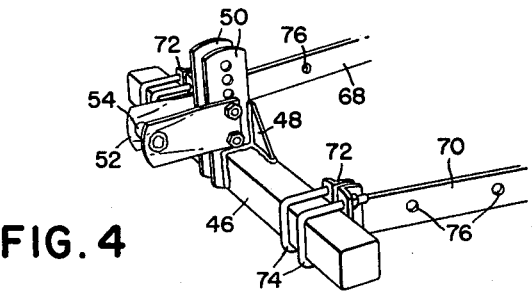
FIG. 4 is a perspective view of the front portion of the hitch device of this invention.

The hitch device 16 of the present invention has a forward portion, indicated generally at 42, and a rear portion, indicated generally at 44. As can best be seen in FIG. 4, the forward portion 42 includes a transversely extending toolbar 46 to which is secured, by means of a gusset plate 48, a pair of parallel apertured members 50 which carry a pair of forwardly extending arms 52 which carry between their forward ends a transversely extending pin member 54. The pin 54 is normally disposed forwardly of a vertical drawbar pin, not shown, on the drawbar 58 of the tractor. The drawbar pin is normally held in place by a clevis 60 carried on the drawbar, the clevis being provided with a spring-biased drawbar pin retainer 62. The hitch device would, unless otherwise restricted, be free to articulate about its forward connection to the drawbar 58.

The forward portion 42 of the hitch is interconnected with the rear portion 44 by a pair of longitudinally extending beams indicated generally at 64, 66. Each of the right and left beams 64, 66 includes right and left arms 68 and 70 which are rigidly secured to mounting brackets 72 by means of welding, the mounting brackets 72 being in turn adjustably secured to the toolbar 46 by means of paired U-bolt 74.

Each of the arms 68 and 70 is provided with a plurality of apertures 76 through which bolts 78 may be passed, the bolts securing the rear ends of the arms 68, 70 to right and left elongated members 80 and 82. Each of the elongated members 80, 82 is secured to mounting brackets 84, by welding (brackets 84 being substantially identical to brackets 72) the mounting brackets in turn being adjustably secured to a transversely extending toolbar 86 by means of paired U-bolts 88.

The toolbar 86, which is part of the rear portion 44 of the hitch, also has secured to it wheels 90 that are rotatably mounted on downwardly depending arms 92, each of the arms having an upwardly extending shaft 94 rigidly secured thereto. The hafts 94 are rotatably disposed within sleeve members 96 which are adjustably secured to the toolbar 86 by means of paired U-bolts 98.

A Y-shaped member 100 having forward diverging arms 102 and a rear cylindrical leg 104 is mounted for rotation about a generally transversely extending axis on the toolbar 86. To this end a tube 106, which telescopically receives the leg 104, is secured to a pair of upwardly extending angles 108 on the toolbar by means of a saddle 110, there being a pivot bolt 112 disposed through the lower ends of the saddle and an aperture within the angles 108. Links 114 are pivotally secured to the forward ends of each of the arms by pivot bolts 116, the links 114 being rigidly securable to a rear toolbar 36 by paired U-bolts 118.

A drawbar 120 is also rigidly secured to the intermediate portion of the toolbar 86.

The planter 10 is provided with a forwardly extending hitch 122 which carries at its forward end a hitch extension 124. The hitch extension 124 carries at its forward end a clevis assembly 126 which is interconnected with the hitch drawbar 120 by means of a drawbar pin 128.

In operation the forward end of the hitch 42 is secured to the tractor drawbar assembly 58–62 for generally swinging movement. The right and left beams 64, 66 are so positioned on the toolbars 46 and 86 that the beams may pass between the standards carried on the tillage implement 14, the length of the beams 64, 66 being so adjusted that the rear toolbar 86 is disposed a sufficient distance behind the tillage implement 14 that there is both clearance for the standards 38, and sufficiet room for the links 114 to be rigidly secured to the rear toolbar 36 of the implement. The telescoping assembly 100, 106 permits the rear portion 44 of the hitch to be supported by castering wheels and yet maintains the drawbar 120 in alignment with the tractor 12 since the rear portion 44 is restricted against lateral movement by the tillage implement 14 and the telescoping assembly 100, 106.

While the preferred structure in which the principles of the present invention have been incorporated is shown and described above, it is to be understood that the inventin is not to be limited to the particular details, shown and described above, but that, in fact, widely different means may be employed in the practice of the broader aspects of the invention.

What is claimed is:

1. In combination, a tractor, a ground-working device having a main frame connected at its forward end to the tractor for restricted lateral movement and for vertical movement about a transverse axis, said frame extending rearwardly from said forward end to a rear end, a rigid fore-and-aft elongated hitch frame having a forward portion adjacent to the forward end of the main frame and articulately connected to the tractor for swinging about both vertical and transverse axes and extending rearwardly lengthwise of said main frame to a rear portion adjacent to the rear end of the main frame, a hitch connection on the rear end portion for connecting an implement in trailing relation to the ground-working device; and a connection between the rear end of the main frame and the rear portion of the hitch frame for restricting relative lateral shifting movement between the hitch frame and the main frame and permitting relative vertical movement between the two frames, said connection including an elongated rigid member, means supporting the member on one frame for rocking motion about a transverse axis, means supporting the member on the other frame for rocking about a second transverse axis, said member being movable lengthwise with respect to at least one of the frames for accommodating relative vertical movement between the frames.

2. The invention defined in claim 1, in which the elongated member includes a laterally rigid connection to one frame and a telescopic connection to the other frame.

3. The invention defined in claim 2, in which the elongated member is of Y shape, having a leg and a pair of arms, link means connecting the arms to one frame on said one transverse axis, and the telescopic connection includes a tube on the other frame on said other transverse axis and telescopically receiving the leg.

4. In a tractor and multiple implement arrangement including a first trailing frame connected to the tractor for relative vertical movement but restricted as to relative lateral movement and a second trailing frame in parallel with the first frame and connected to the tractor by means including both transverse and vertical pivot axes, said second frame having a rear end adapted to have another trailing implement connected thereto, the improvement residing in connection means between the two frames for preventing relative lateral displacement thereof while permitting relative vertical movement thereof, said connecting means including first and second members mounted respectively on the frames and held against lateral displacement relative to the respective frames, and means interconnecting said members to enable relative vertical movement between the two while constraining said two against relative lateral displacement.

5. In combination, a tractor, a ground-working device having a main frame connected at its forward end to the tractor for restricted lateral movement and for vertical movement about a transverse axis, said frame extending rearwardly from said forward end to a rear end, a rigid fore-and-aft elongated hitch frame having a forward portion adjacent to the forward end of the main frame and articulately connected to the tractor for swinging about both vertical and transverse axes and extending rearwardly lengthwise of said main frame to a rear portion adjacent to the rear end of the main frame, a hitch connection on the rear end portion for connecting an implement in trailing relation to the ground-working device; and a connection between the rear end of the main frame and the rear portion of the hitch frame for restricting relative lateral shifting movement between the hitch frame and the main frame and permitting relative vertical movement between the two frames, said forward and rear portions of the hitch being interconnected by a pair of longitudinally extending beams, each of said beams being laterally adjustable on the front and rear portions, and each of said beams also being longitudinally adjustable in length.

References Cited

UNITED STATES PATENTS 1,679,628  8/1928  Roby.
1,872,066  8/1932  Erdman.
3,194,322  7/1965  Hansen _____ 172—310

ROBERT E. BAGWILL, Primary Examiner
A. E. KOPECKI, Assistant Examiner

U.S. Cl. X.R.
172—310, 450